Figure 1:
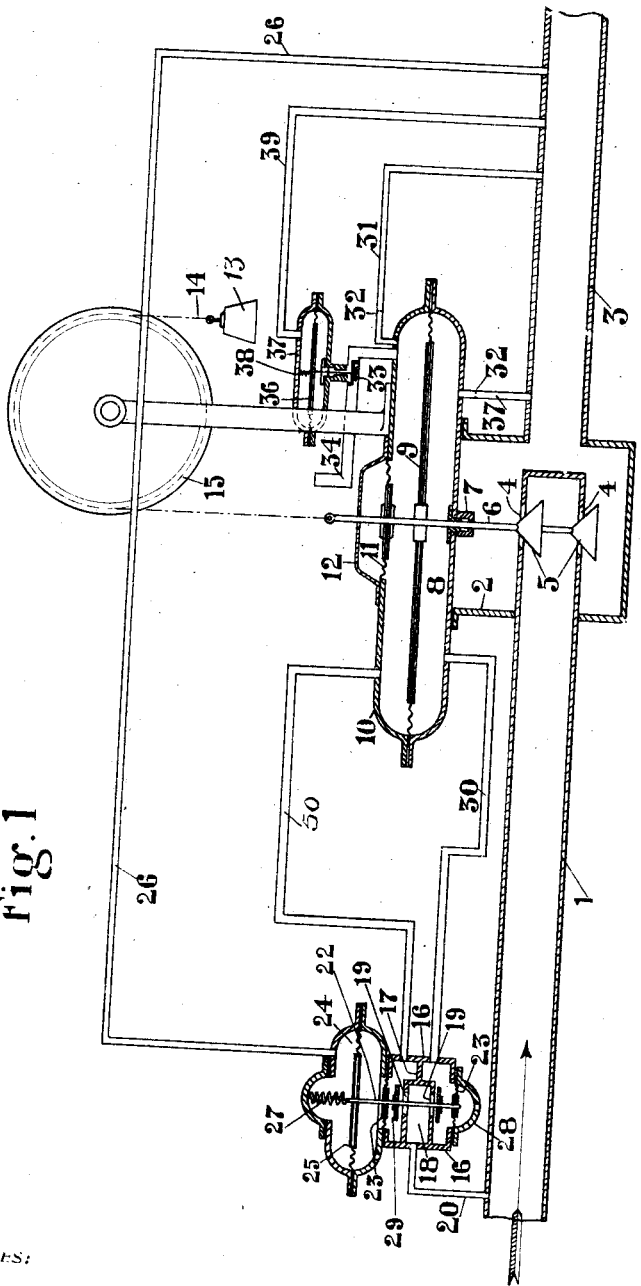

F. L. CROSS.
PRESSURE REGULATOR FOR GAS SYSTEMS.
APPLICATION FILED FEB. 6, 1909.

1,189,349.

Patented July 4, 1916.
2 SHEETS—SHEET 1.

WITNESSES:

INVENTOR
FRANK L. CROSS
BY
ATTORNEYS

F. L. CROSS.
PRESSURE REGULATOR FOR GAS SYSTEMS.
APPLICATION FILED FEB. 6, 1909.
1,189,349.
Patented July 4, 1916.
2 SHEETS—SHEET 2.
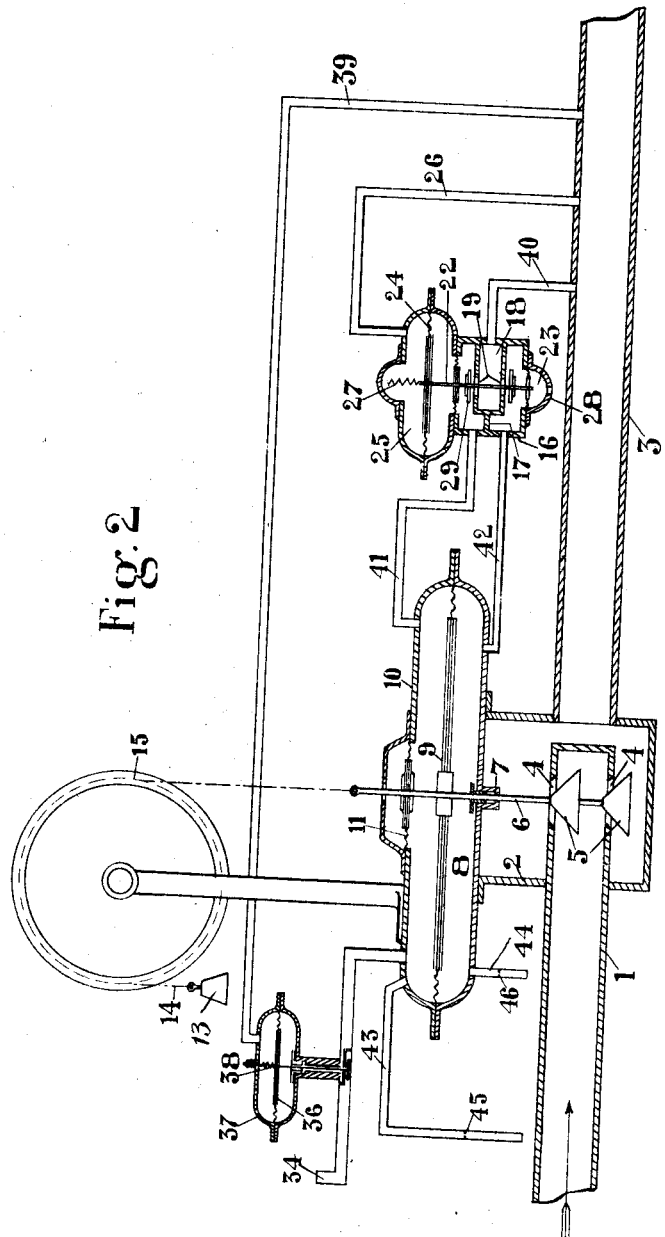
Fig. 2
WITNESSES:
INVENTOR
FRANK L. CROSS
BY 
ATTORNEYS

UNITED STATES PATENT OFFICE.

FRANK L. CROSS, OF DETROIT, MICHIGAN.

PRESSURE-REGULATOR FOR GAS SYSTEMS.

1,189,349.   Specification of Letters Patent.   Patented July 4, 1916.

Application filed February 6, 1909. Serial No. 476,338.

*To all whom it may concern:*

Be it known that I, FRANK L. CROSS, a citizen of the United States of America, residing at Detroit, in the county of Wayne and State of Michigan, have invented certain new and useful Improvements in Pressure-Regulators for Gas Systems, of which the following is a specification, reference being had therein to the accompanying drawings.

This invention relates to a pressure regulator for a gas distributing system or the like for automatically maintaining the desired pressure in a conduit or gas main.

The invention consists in the matters hereinafter set forth and more particularly pointed out in the appended claims.

Referring to the drawings, Figure 1 is a diagrammatic view of an apparatus embodying features of the invention; Fig. 2 is a similar view showing one modification of the apparatus.

As indicated in the drawing a supply main 1 extends into a regulating valve casing 2 that discharges into a service main 3. Alined apertured valve seats 4 that form a restricted outlet of the main 1 into the casing are controlled by suitable closures 5, preferably conical, on an upright stem 6 so disposed that upward movement of the stem closes the passage through the valve to a greater or less extent. The stem extends through a suitable packing gland 7 or like bearing in the casing top and a drum 8 thereon. A movable diaphragm 9 that divides the drum into upper and lower compartments is secured to the stem to operate the latter. An aperture in the upper part 10 of the drum is closed by a flexible diaphragm 11 secured to the stem 6 of considerably less area than that of the main diaphragm 9 whereby the total effective pressure area of the upper face of the main diaphragm in the upper chamber is less than the effective pressure area of the under face of the diaphragm. A bonnet 12 may be added to protect the auxiliary diaphragm 11 and a suitable counterbalance, such as a weight 13, cord 14 and pulley 15, is provided for the stem 6.

There is a control valve with a casing 16 divided by a transverse wall 17 into two compartments. A chamber 18 in this wall is in communication with the upper and lower compartments respectively through alined valve seats 19 and is connected by an inlet pipe 20 with the main 1. A pair of closures 29 carried by a stem 22 are so disposed that raising the stem closes the lower seat and lowering it seals the upper seat. A pair of flexible diaphragms 23 each having respectively the same effective area as the adjacent seat aperture are connected to the stem 22 in order to produce balanced action in the valve. A drum 24 of this valve is divided by a diaphragm 25 into a lower compartment that is open to the air and an upper closed compartment that is in communication with the service main 3 through a pipe 26. A spring 27 or other suitable means is attached to the stem 22 in such manner as to tend to lift it, the tension of the spring being adjusted to meet the requirements of service in operation.

The pipe 20 is in communication with the upper chamber of the drum 8 through the upper seat 19 in the valve casing 16 and a pipe 50 while the lower seat 19 of the casing 16 forms communication through a pipe 30 between the pipe 20 and the lower chamber of the drum 8.

As a result of this construction the following operation results if the tension of the controlling spring 27 is such that the lower valve seat 19 is closed and the upper open when the balance in pressure on the sides of the diaphragm 25 holds the valve otherwise inert. Initial pressure set up in the main 1 enters the upper chamber of the regulating valve through the pipe 50 and tends to open the latter valve by holding the diaphragm 9 down. This is permitted by providing a restricted vent opening 32 which may be to atmosphere or may be into the main 3 through a suitable connection 37. When the flow of gas resulting from the depression of the closures 5 builds up a pressure in the main 3 which is greater than desired, a back pressure through the pipe 26 on the upper part of the diaphragm of the controlling valve depresses the closures thereof so that the upper valve closure seat 19 is either restricted or completely cut off and the companion lower closure 19 more freely opened. This sets up a corresponding closing pressure in the lower drum compartment of the regulating valve and draws the closures 5 toward their respective seats, thereby restricting the flow. If the pipe 50 is closed completely through the seating of the companion seat 19, the contents of the upper compartment of the drum is permitted to slowly escape through a restricted opening 32 which may be either open to atmosphere or to the main 3 through a pipe 31. The outlets retard the escape sufficiently so that the pressure in the chambers is somewhere between that in the supply main and in the service main dependent upon the relative area of the inlet and outlet to each chamber. Consequently, as the valve controls the inlet areas, while the outlets are constant in area, variations in position of the valve cause fluctuations in these chamber pressures. Because of the difference of the effective areas of the upper and lower surfaces of the diaphragm 9 if both closures of the valve 16 remain unseated, there is a certain upward tendency in the diaphragm 9 which causes a restriction in the controlling valve and this restriction results in a drop in pressure between the mains 1 and 3. If for any reason, as for example, sudden check in the consumption of gas from the main 3, the back pressure through the pipe 26 closes the valve 16 to the pipe 50 and thereby throws the pressure against the lower side of the diaphragm 9, and further restricts the passage through the regulating valve. Thus the difference in pressure between the two mains during the movement of gas from one to the other is held substantially constant.

If for any reason the main regulating valve should drop and stick when there is no movement of gas in the mains the apparatus might not work when the gas resumes flow and consequent excessive pressure in the service main would follow. To avoid this a safety valve 33 is connected by a pipe 34 to the upper compartment of the main drum 8, the other end of the pipe 34 opening to atmosphere. A stem 35 that operates this safety valve extends into a drum or shell 37 divided by a movable diaphragm 36 which is adapted to raise or lower the stem, a spring 38 normally holding the stem up and the valve 33 closed. A pressure pipe 39 connects the upper closed compartment of the drum 37 with the main 3. Any pressure above the normal in the latter depresses the diaphragm 37 and opens the safety valve 33, thus giving unrestricted communication between the air in the upper compartment of the drum 8 so that the gas beneath the diaphragm 9 of the latter drum exerts a greater lifting force on the closure 5 and shuts the regulating valve off. This therefore insures the main or regulating valve from remaining open. By proper regulation or adjustment of the weight 13 the point at which the regulating valve should open is readily determined. The same control of mains may be effected by a disposition of the parts shown in Fig. 2 in which the controlling valve responds directly to pressure in the main 3. In such instances an inlet pipe 40 opens from the main 3 into the valve casing chamber, the lower compartment of the casing being connected to the lower compartment of the regulating valve drum 8 by a pipe 42 and the upper compartment by a pipe 41. The same delicacy of action is obtained as in the other construction by venting the drum compartments of the control valve by restricted openings 45 and 46 to air.

By either method of construction an apparatus is obtained which holds the pressure of a service main in substantially constant relation to the pressure of a supply main regardless of the variations of service at the outlet end of the service main.

Obviously, changes in the details of construction may be made without departing from the spirit of my invention and I do not care to limit myself to any particular form or arrangement of parts.

What I claim is:

1. The combination in a gas system, of a supply main, a service main, a fluid pressure operated valve for regulating the flow between the mains, a fluid pressure operated controlling valve adapted to govern the regulating valve and itself controlled by the pressure in the service main, and a safety valve adapted to independently relieve the pressure of fluid operating the regulating valve to close the latter when a predetermined pressure is reached in the service main.

2. The combination in a gas system, of a supply main, a valve regulating the flow from the supply to the service main, means for operating the valve by pressure of fluid in the supply main, a valve for admitting fluid from the supply main to the regulating valve operating means, means for operating the latter valve by pressure of fluid in the service main, the regulating valve being arranged to automatically maintain a difference in pressure between the supply and service mains, and a safety valve operated by pressure in the service main and adapted to relieve fluid pressure in the operating means of the regulating valve to close the latter when the pressure in the service main reaches a predetermined point.

3. The combination in a gas system, of a main, a regulating valve therein, means for operating the valve adapted to be actuated by gas under static pressure in the main to close as the pressure rises, a controlling valve, means for operating the controlling valve adapted to be actuated by gas under static pressure in the main on the outlet side of the regulating valve, the controlling valve and operating means of the regulating valve coacting to operate the regulating valve either in conjunction with or in opposition to the static pressure, and a safety valve adapted when the static pressure in the outlet arm of the main approaches a predetermined point to augment the effective closing pressure.

4. The combination in a gas system, of a main, a regulating valve therein having a drum and a movable main diaphragm therein for operating the valve partially balanced on one side by an opposing diaphragm and arranged to close the valve when the static pressure in the main is above a predetermined point, a controlling valve having one outlet in communication with the drum on one side of the main diaphragm and a second outlet in communication with the drum on the opposite side of the diaphragm, and an inlet in communication with the main, means actuated by gas in the main on the outlet side of the main for moving the controlling valve, and a safety valve operated by gas in the outlet arm of the main adapted to open the drum on the partially balanced side of the diaphragm to atmosphere when the pressure in the outlet of the main reaches a predetermined point.

5. The combination in a gas generating and distributing system, of a conduit, a valve adapted to automatically regulate flow through the conduit, a governor operating under variations in the differences between inlet and outlet pressures in the conduit on either side of the valve to move the valve, and means responding to outlet pressures and controlling the valve through the governor to hold the outlet pressure in the conduit in a constant relation to the inlet pressure.

6. The combination in a gas generating and distributing system, of a conduit, a valve adapted to automatically establish a differential pressure in the conduit whenever there is a flow of fluid therethrough, a governor for the valve adapted to be operated by the differential pressure thus set up, and means responding to outlet pressures to hold an outlet pressure in the conduit in constant relation to the inlet pressure.

7. In combination in a gas generator and distributing system, of a conduit, a valve adapted to automatically regulate the flow through the conduit, a governor for the valve adapted to be operated by the differences in outlet and inlet pressures thus set up, a valve controlling and directing the admission of fluid from the conduit to the governor, and means responding to outlet pressure in the conduit and controlling the valve to hold an outlet pressure in the conduit in constant relation to the inlet pressure.

In testimony whereof I affix my signature in presence of two witnesses.

FRANK L. CROSS.

Witnesses:
C. R. STICKNEY,
A. M. SHANNON.